(12) United States Patent
Lucchesi et al.

(10) Patent No.: US 11,552,363 B2
(45) Date of Patent: *Jan. 10, 2023

(54) COMPOSITE BATTERY ENCLOSURE

(71) Applicant: TPI Composites, Inc., Warren, RI (US)

(72) Inventors: Brian Lucchesi, Warren, RI (US);
Stephen Nolet, Harpswell, ME (US);
McKevin Veloso, Providence, RI (US)

(73) Assignee: TPI Composites, Inc., Warren, RI (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/007,542

(22) Filed: Aug. 31, 2020

(65) Prior Publication Data

US 2020/0395581 A1 Dec. 17, 2020

Related U.S. Application Data

(63) Continuation of application No. 16/588,560, filed on Sep. 30, 2019, now Pat. No. 10,763,473, which is a
(Continued)

(51) Int. Cl.
*H01M 50/20* (2021.01)
*B60K 1/04* (2019.01)

(52) U.S. Cl.
CPC .............. *H01M 50/20* (2021.01); *B60K 1/04* (2013.01); *B60K 2001/0438* (2013.01)

(58) Field of Classification Search
CPC .. H01M 50/20; B60K 1/04; B60K 2001/0438
See application file for complete search history.

(56) References Cited

U.S. PATENT DOCUMENTS

| 5,501,289 A | 3/1996 | Nishikawa et al. |
|---|---|---|
| 10,431,789 B2 | 10/2019 | Lucchesi et al. |

(Continued)

FOREIGN PATENT DOCUMENTS

| EP | 2467253 A1 | 6/2012 |
|---|---|---|
| JP | H06219336 A | 8/1994 |

(Continued)

OTHER PUBLICATIONS

International Search Report and Written Opinion for International Application No. PCT/US2018/046722 dated Oct. 19, 2018.
(Continued)

*Primary Examiner* — Bryan A Evans
(74) *Attorney, Agent, or Firm* — Stephen J. Kenny; Vincenzo DiMonaco; Foley Hoag LLP

(57) ABSTRACT

A battery enclosure for a vehicle chassis having a base member with raised surface features on the upper surface outlining individual cells, each cell configured to receive at least one battery; a cover member having a plurality of depending surface features on the lower surface which are aligned with the surface features of the base member. The cover member includes a channel formed in the upper surface thereof, aligned with and extending along a length of the depending surface feature disposed on the bottom surface. A lattice support structure is also included which has a plurality of support members extending axially and transversely, wherein the lattice support structure is configured to be at least partially disposed within the channel of the cover member and mounted to the vehicle chassis. The lattice support member providing increased rigidity and a load distribution path for externally applied forces (e.g. crash events) to prevent or inhibit enclosure breakage or puncture.

17 Claims, 5 Drawing Sheets

Related U.S. Application Data continuation of application No. 16/103,571, filed on Aug. 14, 2018, now Pat. No. 10,431,789.

(60) Provisional application No. 62/624,288, filed on Jan. 31, 2018.

(56) References Cited

U.S. PATENT DOCUMENTS

| | | | |
|---|---|---|---|
| 10,763,473 B2 | 9/2020 | Lucchesi et al. | |
| 2012/0103714 A1* | 5/2012 | Choi | B62D 29/041 180/68.5 |
| 2014/0284125 A1* | 9/2014 | Katayama | B60L 3/0046 180/68.5 |
| 2014/0360344 A1* | 12/2014 | Pilpel | B32B 27/065 428/419 |
| 2016/0339774 A1* | 11/2016 | Hayashi | B60K 1/04 |
| 2017/0012330 A1* | 1/2017 | Kim | H01M 50/20 |
| 2017/0225558 A1* | 8/2017 | Newman | B60L 50/64 |
| 2017/0305249 A1* | 10/2017 | Hara | B62D 25/2036 |
| 2020/0099026 A1 | 3/2020 | Lucchesi et al. | |
| 2020/0395581 A1 | 12/2020 | Lucchesi et al. | |

FOREIGN PATENT DOCUMENTS

| | | |
|---|---|---|
| JP | H10310650 A | 11/1998 |
| JP | 2011-508095 A | 3/2011 |
| WO | WO-2011/020581 A1 | 2/2011 |
| WO | WO-2013/073464 A1 | 5/2013 |
| WO | WO-2019/152072 A1 | 8/2019 |

OTHER PUBLICATIONS

Extended European Search Report for EP Application No. EP 18903646 dated Jul. 12, 2021.

* cited by examiner

COMPOSITE BATTERY ENCLOSURE

CROSS-REFERENCE TO RELATED APPLICATIONS

This application is a Continuation of and claims the benefit of priority under 35 USC 120 to U.S. patent application Ser. No. 16/588,560 filed Sep. 30, 2019, which is a Continuation of and claims the benefit of priority under 35 USC 120 to U.S. patent application Ser. No. 16/103,571 filed Aug. 14, 2018, which claims the benefit of priority under 35 USC 119 to U.S. Provisional application No. 62/624,288 filed Jan. 31, 2018, the entire contents of which are hereby incorporated by reference.

BACKGROUND OF THE DISCLOSED SUBJECT MATTER

Field of the Disclosed Subject Matter

The disclosed subject matter relates to a system for a composite closure compartment. Particularly, the present disclosed subject matter is directed to a composite battery enclosure.

Description of Related Art

A variety of structures for battery enclosures are known that are self-supporting and are structurally separate from the balance of the vehicle system. This results in added mass for the entire system and thus reduced economy (increasing manufacturing costs) and lower performance (higher weight decreases range of operation between charges or lower fuel economy in a hybrid).

The large mass of batteries typically requires significant material to provide the stiffness and strength to retain the battery or batteries within the vehicle system. Similarly, the battery enclosure of conventional designs requires significant reinforcement to prevent intrusion of objects in the event of a vehicle crash. The structural requirements for the vehicle and the battery enclosure have been traditionally separated whereby the battery enclosure becomes purely parasitic mass and redundant to the performance of the vehicle.

Examples of conventional battery enclosures are provided in the following publications, each of which is hereby incorporated by reference in their entirety: U.S. Pat. Nos. 8,286,743, 8,393,427, 8,833,499, 5,620,057, 7,323,272, 8,115,450, 8,210,301, 8,875,828, 9,331,321; and U.S. Patent Application Publication Numbers 20100136402, 20120103714, 2015079454 and 2015318525.

The presently disclosed subject matter provides a new innovative solution for the storage, protection and use of batteries for hybrid, plug-in hybrid and electric vehicle applications. The invention disclosure fully describes the unique and innovative structural approach to integrating the battery enclosure with the vehicle body in white and/or vehicle chassis. The presently disclosed subject matter solves many of the packaging challenges associated with separate battery enclosures that must exist within the space available of the conventional vehicle design where crash protection is engineered independent of the bolted on battery enclosure. Moreover, the system and structures of the presently disclosed battery enclosure are applicable in hybrid, plug-in hybrid and plug-in electric passenger vehicles for transportation as well as other mass transportation systems (e.g., buses, shuttles and rail cars).

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a system and structures forming a battery enclosure for a vehicle chassis comprising a base member having an upper and lower surface, the base member having a plurality of raised surface features on the upper surface outlining individual cells, each cell configured to receive at least one battery (which can be configured as a discrete module in embodiments wherein a plurality of modules are employed to form a battery); a cover member having an upper and lower surface, the cover member having a plurality of depending surface features on the lower surface outlining individual cells, the surface features of the cover member aligned with the surface features of the base member, and the cover member having at least one channel formed in the upper surface thereof, aligned with and extending along a length of the depending surface feature disposed on the bottom surface; a lattice support structure, the lattice support structure including a plurality of support members extending axially and a plurality of support members extending transversely, wherein the lattice support structure is configured to be at least partially disposed within the channel of the cover member and mounted to the vehicle chassis.

In some embodiments the support members of the lattice support structure include hollow beams that are composed of metal, and/or a plurality of individual layers of continuous fiber reinforcement having at least 60% of reinforcing fibers aligned with a primary axis of the support member.

In some embodiments the upper surface of the lattice support structure is coupled to the vehicle chassis with boundary edges of the lattice support structure disposed between rocker panels of the vehicle chassis, and the individual cells include a plurality of symmetric cells.

In some embodiments the lattice support structure includes a first axial support member and a second axial support member having a common cross-section, and a third axial support member having a different cross-section.

In some embodiments at least one depending surface feature of the cover member extends a distance greater than at least one raised surface feature of the base member.

In some embodiments the surface features of the cover member engage with the surface features of the base member to form at least one closed volume cell, and the cover member has a flange extending around the periphery, the bottom surface of the lattice support structure engaging the upper surface of the cover member flange such that the cover member and lattice support structure form a load-bearing floor of the vehicle.

In some embodiments at least one of the cover member and base member are formed as a unitary molding with reinforcing fibers disposed within a resin.

In some embodiments the fibers include at least one carbon fiber, glass fiber, aramid fiber, polyethylene or polypropylene fiber, and the resin includes is a liquid thermosetting resin including at least one of epoxy, unsaturated isophthalic polyester, vinyl-ester, methyl-methacrylate or phenolic resin.

In some embodiments the resin includes a thermoplastic resin including at least one of polyethylene, polypropylene, polyamide, acrylic, polycarbonate, polybutylene terephthalate (PBT), or polyphenylene sulfide (PPS) resin.

In some embodiments at least one of the cover member and base member include a plurality of individual layers of continuous fiber reinforcement aligned in a cross-plied fashion where the angle of the fiber with respect to the axial orientation of the vehicle is greater than +/−20 degrees and less than +/−70 degrees.

In some embodiments at least one of the cover member and base member include a plurality of individual layers having randomly oriented discontinuous reinforcing fibers.

In some embodiments the battery enclosure for a vehicle chassis comprises a base member having an upper and lower surface, the base member having a plurality of raised surface features on the upper surface outlining individual cells, each cell configured to receive at least one battery; a cover member having an upper and lower surface, the cover member having a plurality of depending surface features on the lower surface outlining individual cells, the surface features of the cover member aligned with the surface features of the base member, and the cover member having at least one channel formed in the upper surface thereof, aligned with and extending along a length of the depending surface feature disposed on the bottom surface; a lattice support structure, the lattice support structure including a plurality of support members extending axially and a plurality of support members extending transversely to surround each cell contained within the enclosure, wherein upper and lower surfaces of the lattice support structure define a thickness, the thickness of the lattice support structure equal to a depth of the channel in the cover member.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 2A being a top-perspective view; FIGS. 2B-C being bottom-perspective views; FIG. 2D being a cross sectional view.

FIGS. 3A and 3C being top-perspective views; FIG. 3B being a bottom-perspective view; FIG. 3D being a cross sectional view.

FIGS. 4A and 4C being top-perspective views; FIG. 4B being a bottom-perspective view; FIG. 4D being a cross sectional view.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
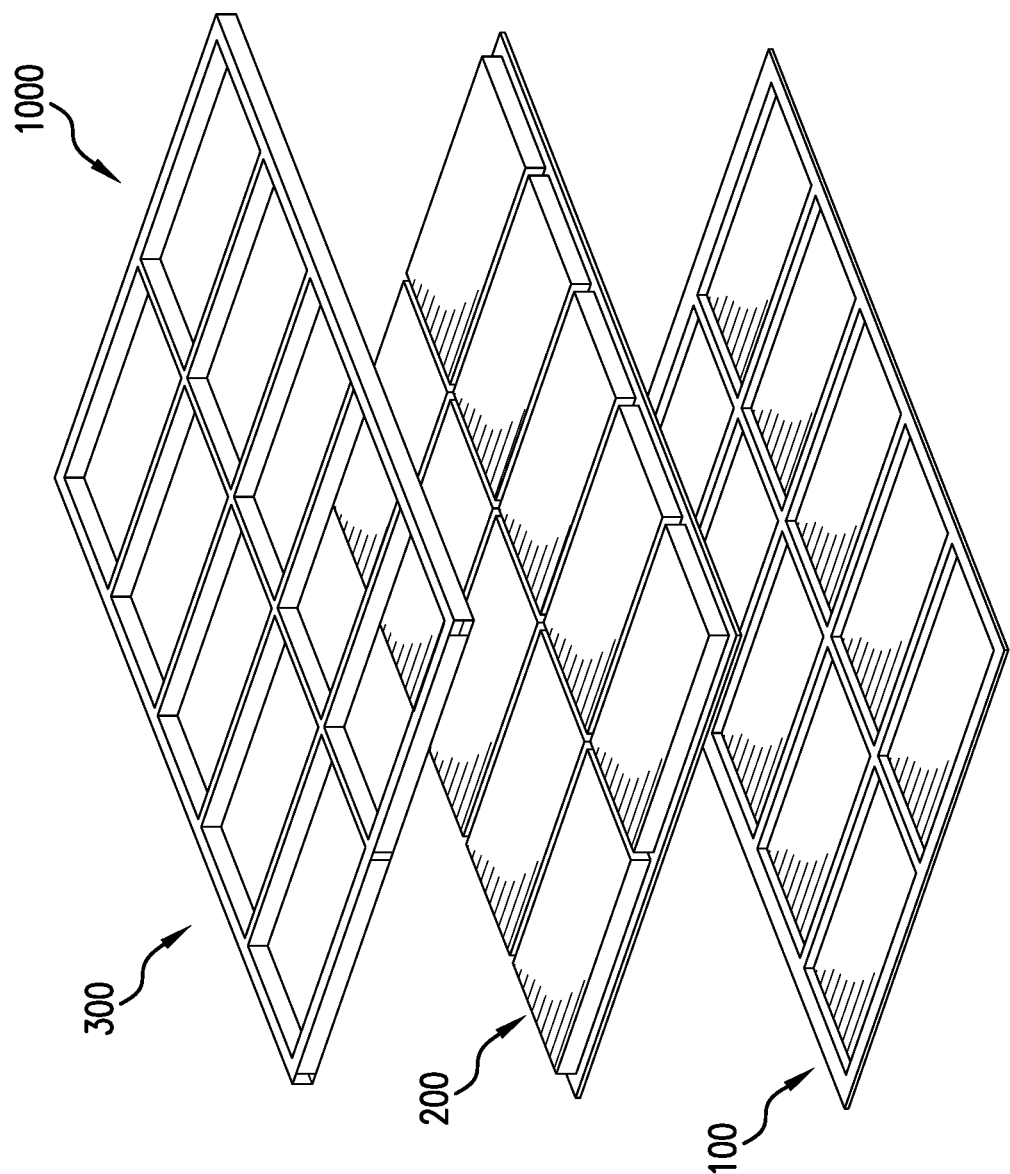
FIG. 1 is an exploded schematic representation showing a perspective view of the components of the battery enclosure in accordance with the disclosed subject matter.

The methods and systems presented herein may be used for a battery enclosure structure. The disclosed subject matter is particularly suited for a composite battery enclosure structure that can be directly integrated into the vehicle chassis thereby enhancing the structural integrity while protecting the battery modules from intrusion and thermal leak/intrusion. For purpose of explanation and illustration, and not limitation, an exemplary embodiment of the system in accordance with the disclosed subject matter is shown in FIG. 1 and is designated generally by reference character 1000. Similar reference numerals (differentiated by the leading numeral) may be provided among the various views and Figures presented herein to denote functionally corresponding, but not necessarily identical structures.

As shown in FIG. 1, the battery enclosure system 1000 generally includes a plurality of components including a base member 100, a cover member 200 and lattice support structure 300, each of which is described in further detail below.

Base Member

FIGS. 1 and 2A-D show an exemplary embodiment of the lower structure of the battery enclosure.

In some embodiments, the base member 100 can be formed as a unitary molding with a plurality of axial and transverse surface features 110 that outline and form "cells" for receipt of the individual batteries that constitute the vehicle power system. The presence of such surface features 110 facilitates assembly by providing tactile and visual confirmation of proper installment of the batteries within each cell via proper registration of mating surfaces. Additionally, the formation of discrete cells is advantageous in that it can isolate adverse events (e.g. leakage, thermal change, etc.) between neighboring batteries within the enclosure.

Figure 2A:
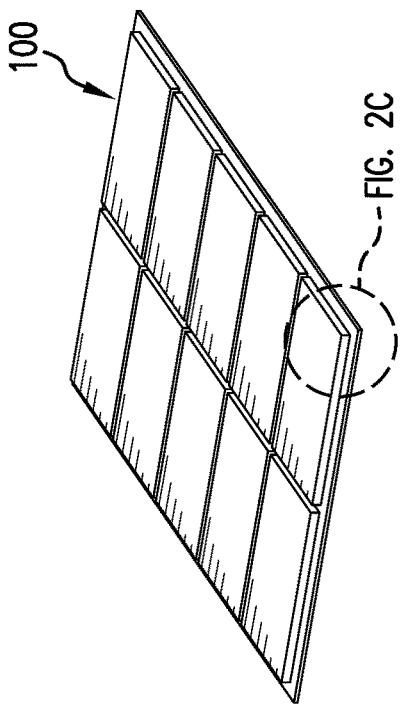
FIGS. 2A-D are schematic representations of the base member in accordance with the disclosed subject matter.
Figure 2B:
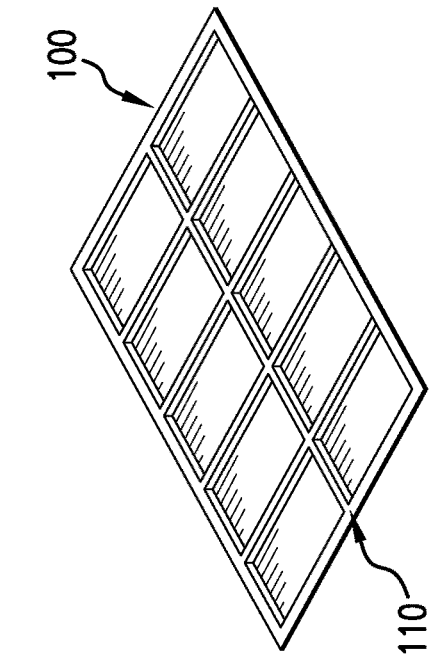
Figure 2C:
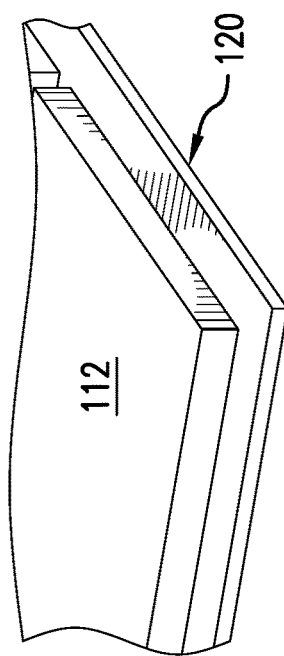
Figure 2D:
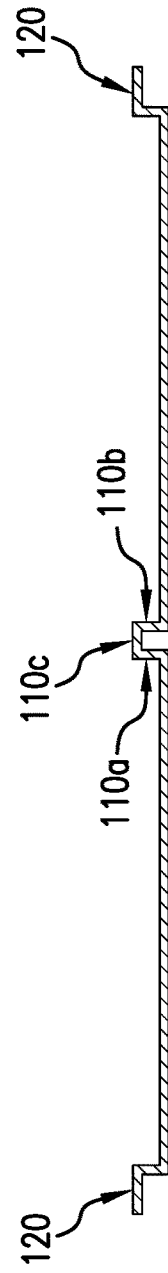

In the exemplary embodiment shown, the surface features are raised or upwardly extending ribs or channels 110 which outline rectangular cells, though it is to be understood that the base member 100 can be formed with alternative shaped cells. Similarly, the surface features 110 can be formed as channels with sidewalls 110a,110b as shown in FIG. 2D, which protrude upwardly from the bottom surface of the base member 112. In the exemplary embodiment shown, the sidewalls 110a,110b have a height which is equivalent to the width of horizontal top portion 110c. However, it is to be understood that various dimensions, and relative proportions, can be provided, as desired.

In such embodiments, the bottom surface 112 can be formed with a series of breaks or discontinuities within the plane of its lower surface (at locations coinciding with the channel tops 110c). Additionally, or alternatively, the surface features 110 can be formed as solid rib members protruding upwardly from a continuous bottom surface of the base member such that there are no breaks or discontinuities formed therein. Thus, the battery enclosure unit described herein can form a flat and planar surface forming the underside of the vehicle when the battery enclosure is installed.

The base member 100 can also include a flange 120 surrounding a periphery, or select portion(s) thereof. The flange 120 can be coupled to the cover member 200, as described in further detail below. In some embodiments the flange 120 can be formed with a width that extends a distance laterally which is greater than the distance, or vertical height, of the surface features 110.

Additionally, the axial and transverse surface features 110, and flange portion 120, can be positioned to match or align with similar axial and transversely aligned surface features and flange portion in the cover member 200 so as to fully engage/envelope and create a closed volume to contain the individual battery cells that are assembled within, as described in more detail below.

The base member 100 can be formed from a variety of materials including reinforcing fibers. Some illustrative examples of such reinforcing fibers include carbon fiber, glass fiber, Kevlar (aramid) fiber; and combinations thereof. In some embodiments, polyethylene or polypropylene fibers can be employed that are stabilized in a matrix of resin from any of the following chemical classes of liquid thermosetting resins: epoxy, unsaturated isophthalic polyester, vinylester, methyl-methacrylate or phenolic resins; and combinations thereof. In some embodiments, the reinforcing fibers can be stabilized in a thermoplastic resin that includes polyethylene, polypropylene, polyamide (nylon), acrylic, polycarbonate, polybutylene terephthalate (PBT), or polyphenylene sulfide (PPS); or combinations thereof.

In accordance with an aspect of the disclosure, the materials of construction can include a plurality of individual layers of aligned, continuous fiber reinforcement of the fiber materials noted above. For example, the base member can be fabricated as a sandwich material with a plurality of layers of reinforcing materials laminated to a core of low density material from the class of core materials that may include: end grain balsa or the class of resins cast or extruded with internal foaming (blowing agents) that include polyvinyl chloride (PVC), cross-linked polyvinyl chloride (CPVC), styrene acrylonitrile (SAN), polyurethane, or polyethylene terephthalate (PET); and combinations thereof. In such embodiments, the lower structure gains resistance from deformation due to laterally applied loading that would be exerted from the load applied by the dense battery packs. However, the in-plane (extensional) stiffness of the lower structure can remain quite compliant (less stiff).

In some embodiments, the base member can be formed from a plurality of individual layers of aligned, continuous fiber reinforcement made up of two or more layers of fibers aligned in a cross-plied fashion. For instance, the angle of the fiber with respect to the axial orientation of the vehicle can be greater than +/−20 degrees and less than +/−70 degrees, though alternative angles can be employed, as desired. Such configurations can provide increased torsional rigidity to the battery enclosure structure.

Additionally, or alternatively, the base member can be formed from a plurality of individual layers of reinforcing fibers which consist of discontinuous randomly oriented fibers from the class of reinforcements that include carbon fiber, glass fiber and Kevlar (aramid) fiber, polyethylene or polypropylene fibers.

Cover Member

FIGS. 1 and 3A-D show an exemplary embodiment of the cover member of the battery enclosure.

In some embodiments, the cover member 200 can be formed as a unitary molding with a plurality of axial and transverse surface features 210 that outline and form "cells" for receipt of the individual batteries that constitute the vehicle power system. The presence of such surface features 210 facilitates assembly by providing tactile and visual confirmation of proper installment of the batteries within each cell via proper registration of mating surfaces.

Figure 3A:
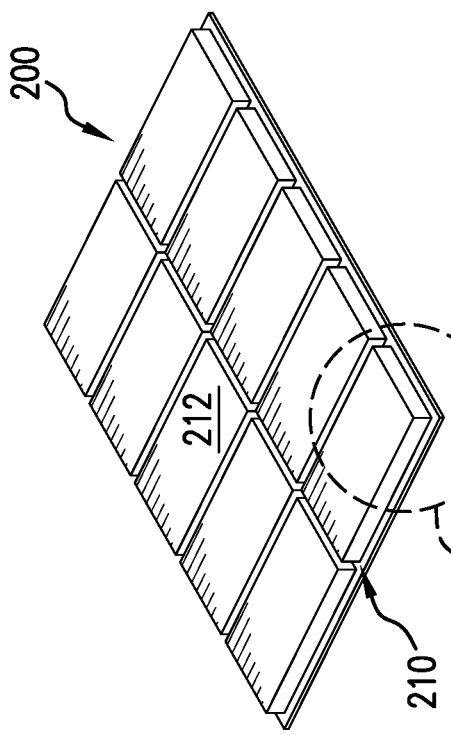
FIGS. 3A-D are schematic representations of the cover member in accordance with the disclosed subject matter.
Figure 3B:
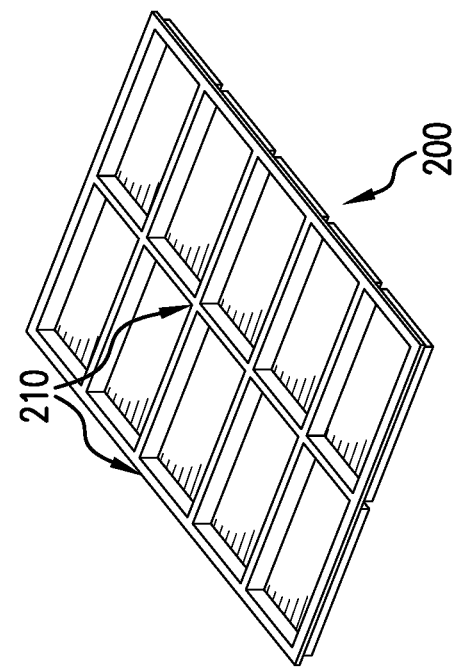
Figure 3C:
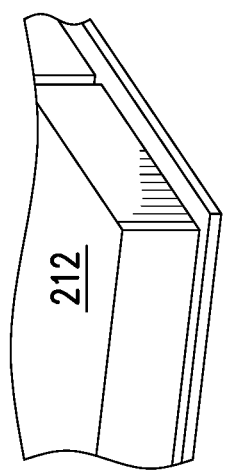
Figure 3D:
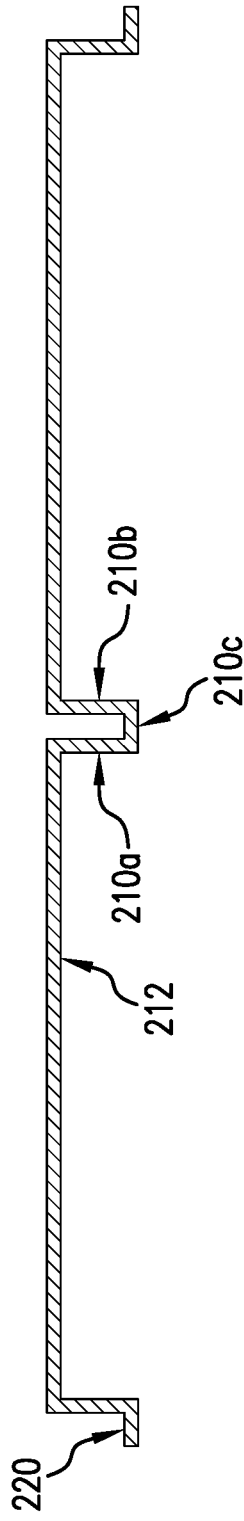

In the exemplary embodiment shown, the surface features are depending or downwardly extending ribs or channels 210 which outline rectangular cells, though it is to be understood that the cover member 200 can be formed with alternative shaped cells. Similarly, the surface features 210 can be formed as channels with sidewalls 210a,210b as shown in FIG. 3D, which protrude downwardly from the bottom surface of the cover member 212. In the exemplary embodiment shown, the sidewalls 210a,210b have a height which is equivalent to the width of horizontal top portion 210c. However, it is to be understood that various dimensions, and relative proportions, can be provided, as desired.

In such embodiments, the top surface 212 can be formed with a series of breaks or discontinuities within the plane of its upper surface (at locations coinciding with the channel tops 210c). Additionally, or alternatively, the surface features 210 can be formed as solid rib members protruding downwardly from a continuous top surface of the cover member such that there are no breaks or discontinuities formed therein. Thus, the battery enclosure unit described herein can form a flat and planar surface on both its upper and lower surfaces. Such planar surfaces are advantageous in that a greater surface area is provided for engagement with the vehicle chassis.

The cover member 200 can also include a flange 220 surrounding a periphery, or select portion(s) thereof. The flange 220 can be coupled to the corresponding flange 110 of the base member 100 in a variety of ways including mechanical fastening, chemical (e.g. adhesive) bonding and/or fusing (e.g. ultrasonic welding). In some embodiments the flange 220 can be formed with a width that extends a distance laterally which is greater than the distance, or vertical height, of the surface features 210.

Additionally, the axial and transverse surface features 210, and flange portion 220 of the cover member 200, can be positioned to match or align with similar axial and transversely aligned surface features 110 and flange portion 120 in the base member 100 so as to fully engage/envelope and create a closed volume to contain the individual battery cells that are assembled within. As noted above, the formation of a closed volume is advantageous for isolating adverse events within any particular cell(s). In order to form such closed cells, the surface features 110, 210 are sized and shaped to engage each other. In some embodiments, the surface features 110 can extend upwardly a distance that is equivalent to the distance the surface feature 210 extends downwardly so that peaks 110c, 210c abut each other at location that is approximately the midpoint of the battery contained therein. In other embodiments, the sidewalls 110a, 11b can be formed with a height that is equal to or greater than the height of a battery to be positioned within the cell. Additionally, or alternatively, the depending surface features 210 of the cover member 200 can extend a distance which is greater than distance that surface feature 110 of the base member 100 extends upwardly. In some embodiments, the surface features 110, 210 can be formed with a height that varies along the length. Accordingly, the sidewalls of the surface features 110, 210 can be sized and shaped to increase structural integrity, and/or accommodate the design of the vehicle chassis, as desired.

In some embodiments, an additional sealing member can be provided between the cover member 200 and the base member 100. The sealing member can extend only around the periphery, i.e. between flanges 220, 120. Additionally, or alternatively, the sealing member can extend around select cells (i.e. between raised surface features 110c, 210c). The sealing member can be formed as a compressible gasket, e.g. O-ring, to prevent fluid from entering or exiting the cells.

The cover member 200 can be formed from a variety of materials including reinforcing fibers. Some illustrative examples of such reinforcing fibers include carbon fiber, glass fiber, Kevlar (aramid) fiber; and combinations thereof. In some embodiments, polyethylene or polypropylene fibers can be employed that are stabilized in a matrix of resin from any of the following chemical classes of liquid thermosetting resins: epoxy, unsaturated isophthalic polyester, vinylester, methyl-methacrylate or phenolic resins; or combinations thereof. In some embodiments, the reinforcing fibers can be stabilized in a thermoplastic resin that includes polyethylene, polypropylene, polyamide (nylon), acrylic, polycarbonate, polybutylene terephthalate (PBT), or polyphenylene sulfide (PPS); or combinations thereof.

In accordance with an aspect of the disclosure, the materials of construction can include a plurality of individual layers of aligned, continuous fiber reinforcement of the fiber materials noted above. For example, the base member can be fabricated as a sandwich material with a plurality of layers of reinforcing materials laminated to a core of low density material from the class of core materials that may include: end grain balsa or the class of resins cast or extruded with internal foaming (blowing agents) that include polyvinyl chloride (PVC), cross-linked polyvinyl chloride (CPVC), styrene acrylonitrile (SAN), polyurethane, or polyethylene terephthalate (PET); and combinations thereof. In such embodiments, the cover member gains resistance from deformation due to laterally applied loading that would be exerted from the load applied by the dense battery packs. However, the in-plane (extensional) stiffness of the lower structure can remain quite compliant (less stiff).

In some embodiments, the cover member can be formed from a plurality of individual layers of aligned, continuous fiber reinforcement made up of two or more layers of fibers aligned in a cross-plied fashion. For instance, the angle of the fiber with respect to the axial orientation of the vehicle can be greater than +/−20 degrees and less than +/−70 degrees, though alternative angles can be employed, as desired. Such configurations can provide increased torsional rigidity to the battery enclosure structure.

Additionally, or alternatively, the cover member can be formed from a plurality of individual layers of reinforcing fibers which consist of discontinuous randomly oriented fibers from the class of reinforcements that include carbon fiber, glass fiber and Kevlar (aramid) fiber, polyethylene or polypropylene fibers.

The cover member 200, and/or base member 100, can be formed from a variety of manufacturing techniques. For example, a liquid compression molding (LCM) process can be employed to fabricate the cover and base members. Additionally, resin may be robotically layered on top of the part prior to entering press vs injecting with resin into tool with High Pressure Resin Transfer Molding (HP-RTM). In some instances, the LCM technique can provide advantages (vs HP-RTM) including: faster cycle time since resin is applied outside the mold; less complicated tooling; no preforming required and thus less waste. Furthermore, to facilitate the containment of adverse events within a given cell, the cover member 200 and/or base member 100 can be formed from materials which exhibit a heat resistance of 600° C. for a period of an hour without compromising the structural integrity of the member (e.g. no warping, thinning, formation of holes, etc.).

Lattice Support Structure

FIGS. 1 and 4A-D show an exemplary embodiment of the lattice support structure 300 of the battery enclosure.

In the exemplary embodiment shown, the lattice support structure 300 is sized and shaped to fit within the slots on the upper surface of the cover member 200, i.e., in the recess formed by the surface feature 210c. FIG. 4 depicts the integration of the lattice support structure 300 with the assembled cover 200 and base member 100 of the enclosure. In this exemplary embodiment, the lattice support structure 300 includes axially and transversely assembled support members 310, 312 that fully engage the axial and transverse channels molded into the cover member 200, and upper surface of the cover member flange 220, providing a stiff structure upon which the cover member is attached. In this configuration the lattice support structure 300 provides a stiff frame and direct load path in the event of a lateral impact (along support members 312) or frontal/rear impact (along support members 310). As such, when the battery enclosure is assembled and installed on the vehicle chassis, the cover member and lattice support structure form a load-bearing floor of the vehicle.

Figure 4B:
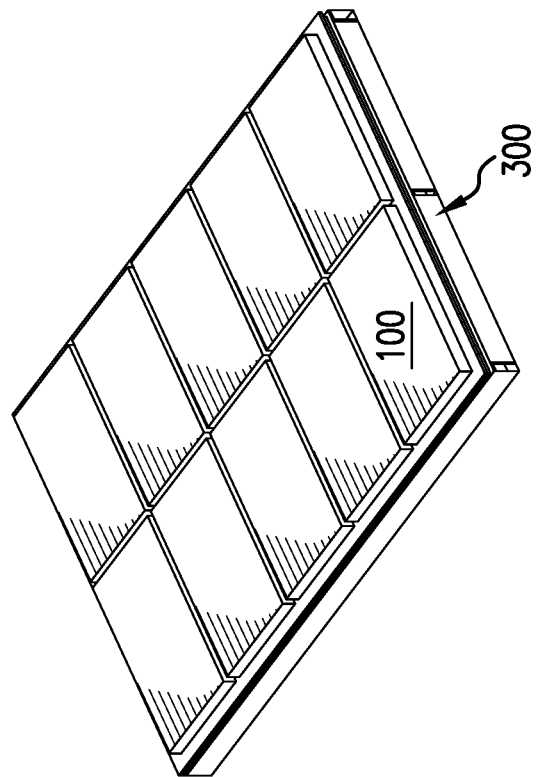
FIGS. 4A-D are schematic representations of the base member, with cover member and lattice support structure in accordance with the disclosed subject matter.
Figure 4A:
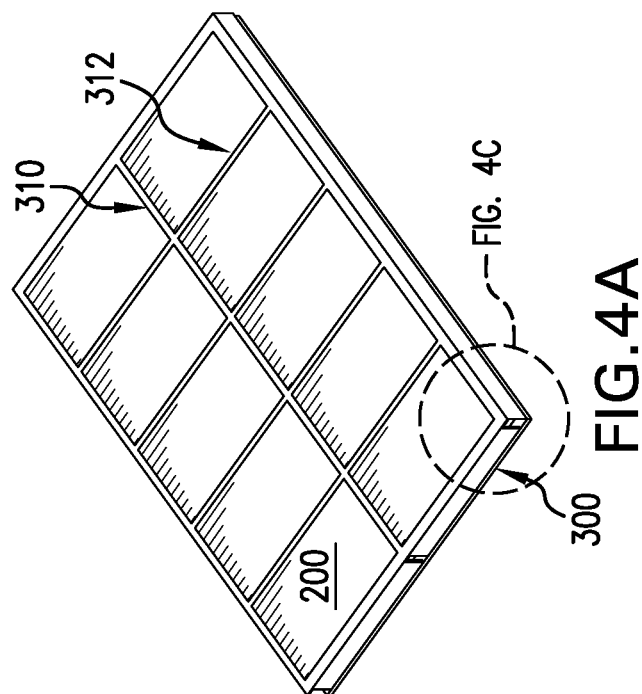
Figure 4C:
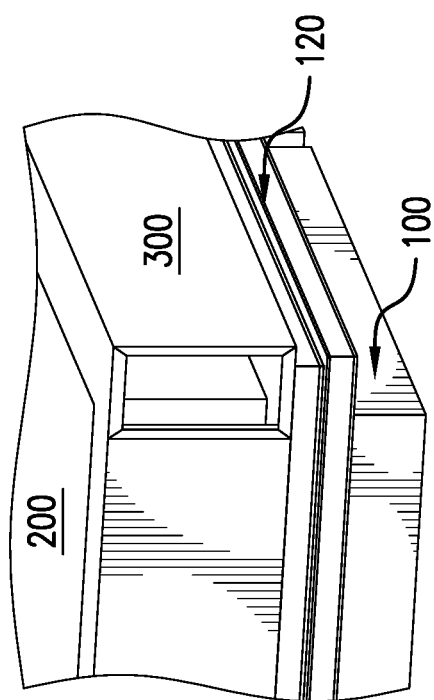
Figure 4D:
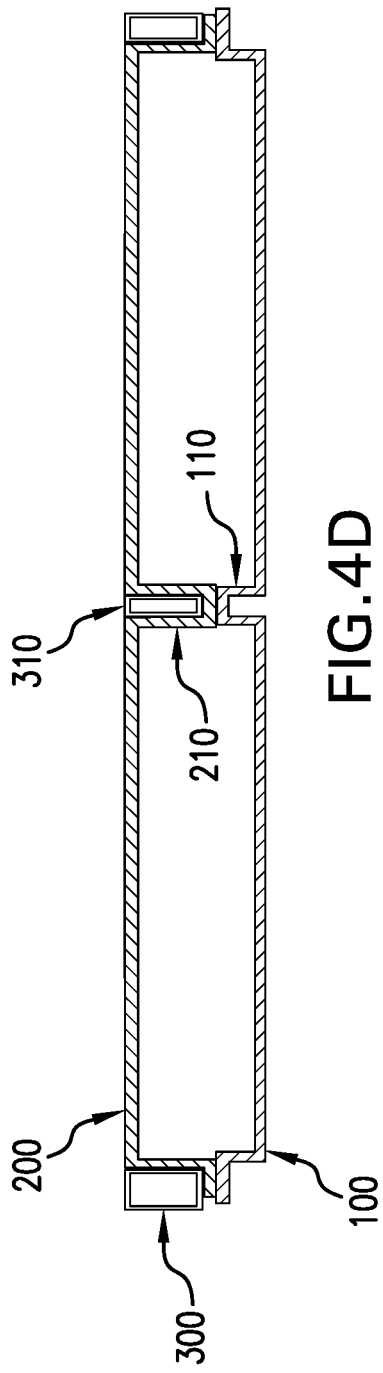

As shown in FIG. 4C-D, in some embodiments the lattice support structure 300 can be formed with hollow beams 310, 312. Additionally, the support members surround the entire cell. The lattice support structure 300 has a height, or thickness, which is equivalent to the depth of sidewalls 210a, 210b of the cover member 200 such that, when the lattice support member 300 is attached to the cover member, the upper surface of the lattice support member 300 is flush, or in plane with, the upper surface of the cover member 200 as shown in FIG. 4D. The upper surface of the lattice support structure 300 is coupled to the vehicle chassis. In some embodiments, the battery enclosure unit described herein is sized such that the boundary edges are positioned between the rocker panels of the vehicle chassis. The lattice support structure 300 can be coupled to the cover member (e.g. along flange 210, and channels 210c) in a variety of ways including mechanical fastening, chemical (e.g. adhesive) bonding and/or fusing (e.g. ultrasonic welding).

In some embodiments the support members of the lattice support structure 300 are formed with a uniform cross sectional shape, whereas in other embodiments the support structures are formed with varying dimensions. For example, the axial support members forming the edges of the lattice support member 300 can have a larger cross-sectional shape than the axial support member(s) disposed between the edges, e.g. along the centerline, as shown in FIG. 4D.

The lattice support structure 300 can be formed from a variety of materials such as extruded metals including carbon steel, aluminum and alloys or combinations thereof. Additionally, or alternatively, the lattice support member 300 can also be fabricated from reinforced polymer composites which are pultruded with reinforcing fibers that may include any combination of fibers and resins, as discussed above with respect to the base and cover members.

Also, and similarly to the base and cover member, the lattice support structure can be fabricated from continuous fiber reinforced polymer composites. In such embodiments, at least 60% of the reinforcing fiber is aligned with the primary axis of the support member so as to create a predominately orthotropic structure with high stiffness along the length of the beam.

In accordance with an aspect of the disclosure, the lattice structure provides a high degree of rigidity along its length which provides a stiff in-plane load path for externally applied loads resulting from an impact or crash of the vehicle. In comparison, the cover and base member fiber alignment that is not aligned with the axial or transverse orientation of the vehicle presents a lower in-plane stiffness, therefore avoiding loads being carried by the enclosures that contain the vehicle battery cells. This further protects the batteries and while simultaneously providing a stiff framework for the vehicle to prevent intrusion of the passenger compartment during a crash event.

In the embodiments illustrated in FIGS. 1-4, the cells are symmetrical (i.e. rectangular), however alternative designs are within the scope of the present disclosure. For example, raised surface features 110, 210 and the lattice support structure support beams (or collectively the "cell walls") can be formed with varying, non-uniform, geometries. For instance, a gradient design can be employed with a greater number of cell walls (e.g. either smaller sized cells, or duplicate/parallel reinforcing walls) at the front of the battery enclosure, so as to increase rigidity for front-impact scenarios.

Additionally, in some embodiments the cell walls can have access features (e.g. apertures, grooves, etc.) formed therein to allow conduits and interconnections between neighboring cells such as wiring to/from the batteries contained within the cells. Similarly, these access features can serve as a ventilation means between battery cells. In some embodiments it may be desirable to direct a fluid flow through such access features to provide heating or cooling of the cells. Furthermore, in some embodiments the composite enclosure can include an access point, e.g. for technicians to replace equipment having a limited life cycle such as fuses, printed circuit boards, connectors, control equipment, etc. The access point can be formed as a resealable panel which can be opened by sliding along a horizontal axis of the enclosure, by pivoting about a hinge formed in the enclosure, or by being removed from the remainder of the enclosure. In some embodiments, the access point (and underlying replaceable equipment) is located in a compartment that is segregated from (i.e. not open to, nor in fluid communication with) the cells containing batteries. This configuration ensures a hermetic seal is maintained at all times (i.e. even when the access panel is open) between the batteries and the ambient air.

Furthermore, although the exemplary embodiments illustrated herein depict a generally rectangular enclosure with constant thickness, alternative designs can be provided, e.g. battery enclosures having varied (tapered or stepped) width and/or height to accommodate both the battery capacity desired, and the vehicle chassis design dictating how and where the battery enclosure is to be coupled.

In some embodiments, a plurality of composite battery enclosures as described above, can be combined in a modular fashion, e.g., vertically stacked on top of each other to increase battery capacity. Such stacking increases the mass, and thus dampens any undesired vibratory loads, as well as increases the rigidity of the aggregate structure. Moreover, the composite battery enclosures of the present disclosure can be retrofitted to a previously formed vehicle chassis.

In accordance with another aspect of the disclosure, the composite battery enclosures described herein can incorporate electromagnetic shielding properties. In some embodiments the electromagnetic shielding can be provided around the exterior of the enclosure. In some embodiments the electromagnetic shielding can be provided around select cells (individual or plurality) of the enclosure. The presence of such EMF/EMC shielding inhibits any undesired electrical interference between the battery and other components of the vehicle.

In accordance with yet another aspect of the disclosure, the composite enclosures described herein can be formed from a plurality of "functionally graded" laminates, i.e., each laminate serving a specific and discrete function. For example, the composite can have a first laminate layer a layer (or plurality of layers) of carbon nano-tube enriched (e.g. graphene) composite plies to create an electrically conductive surface that acts both as a ground plane, as well as providing electromagnetic shielding functionality. Additionally, a layer of phenolic matrix composites can be formed on the interior of the enclosure to provide a thermal barrier which protects against thermal runaway of a battery as well as preventing catastrophic failure. Furthermore, an armour layer composed of aramid, crystalline polyethylene, or Dyneema, can be incorporated to provide local impact (penetration) protection, etc.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A battery enclosure for a vehicle chassis comprising:
    a base member having an upper and lower surface, the base member having a plurality of raised surface features on the upper surface outlining individual cells, each cell configured to receive at least one battery;
    a cover member having an upper and lower surface, the cover member having a plurality of depending surface features on the lower surface outlining individual cells, the surface features of the cover member aligned with the surface features of the base member, and
        the cover member having at least one channel formed in the upper surface thereof, aligned with and extending along a length of the depending surface feature disposed on the bottom surface;
    a lattice support structure, the lattice support structure including a plurality of support members extending axially and a plurality of support members extending transversely,
        wherein the lattice support structure is configured to be at least partially disposed within the channel of the cover member, with a transverse support member disposed between adjacent cells of the cover member;
        wherein the cover member has a flange extending around the periphery, the bottom surface of the lattice support structure engaging the upper surface of the cover member flange, and
    wherein at least one of the base, cover and lattice support structure are mounted to the vehicle chassis.

2. The battery enclosure of claim 1, wherein a plurality of transversely extending support members of the lattice support structure are coupled to the same axially extending support member.

3. The battery enclosure of claim 1, wherein at least one axially extending support member of the lattice support structure extends adjacent to every cell.

4. The battery enclosure of claim 1, wherein the support members of the lattice support structure surround each cell contained within the enclosure.

5. The battery enclosure of claim 1, wherein the lower surface of the base member is configured as a continuous surface.

6. The battery enclosure of claim 1, wherein at least one of the base member and cover member include a plurality of individual layers, each layer having a functionally graded laminate.

7. The battery enclosure of claim 1, wherein the support members of the lattice support structure includes hollow beams.

8. The battery enclosure of claim 1, wherein the lattice support structure is composed of metal.

9. The battery enclosure of claim 1, wherein boundary edges of the lattice support structure are disposed between rocker panels of the vehicle chassis.

10. The battery enclosure of claim 1, wherein at least one depending surface feature of the cover member extends a distance greater than at least one raised surface feature of the base member.

11. The battery enclosure of claim 1, wherein the surface features of the cover member engage with the surface features of the base member to form at least one closed volume cell.

12. The battery enclosure of claim 1, wherein the cover member and lattice support structure form a load-bearing floor of the vehicle.

13. The battery enclosure of claim 1, wherein at least one of the cover member and base member are formed as a unitary molding.

14. The battery enclosure of claim 1, wherein at least one of the cover member and base member are formed with reinforcing fibers disposed within a resin.

15. The battery enclosure of claim 14, wherein the fibers include at least one carbon fiber, glass fiber, aramid fiber, polyethylene or polypropylene fiber.

16. The battery enclosure of claim 14, wherein at least one of the cover member and base member include a plurality of individual layers of continuous fiber reinforcement aligned in a cross-plied fashion where the angle of the fiber with respect to the axial orientation of the vehicle is greater than +/−20 degrees and less than +/−70 degrees.

17. The battery enclosure of claim 1, wherein upper and lower surfaces of the lattice support structure define a thickness, the thickness of the lattice support structure equal to a depth of the channel in the cover member.

* * * * *